April 30, 1935.   J. LEDWINKA   1,999,937
PNEUMATIC TIRE
Filed June 20, 1932   2 Sheets-Sheet 1

INVENTOR
Joseph Ledwinka,
BY
John P. Tarbox
ATTORNEY

April 30, 1935.   J. LEDWINKA   1,999,937
PNEUMATIC TIRE
Filed June 20, 1932    2 Sheets-Sheet 2

INVENTOR
Joseph Ledwinka
BY
John P. Sarbox
ATTORNEY

Patented Apr. 30, 1935

1,999,937

UNITED STATES PATENT OFFICE 1,999,937

PNEUMATIC TIRE

Joseph Ledwinka, Philadelphia, Pa., assignor to Edward G. Budd Manufacturing Company, Philadelphia, Pa., a corporation of Pennsylvania Application June 20, 1932, Serial No. 618,101

4 Claims. (Cl. 295—31)

The present invention relates in general to pneumatic tires and in particular to pneumatic tired flanged wheels for rail cars.

Its main object is the provision of a pneumatic tire effective in combination with a flanged wheel to operate normally as a full pneumatic tire and to prevent the wheel flange from striking the fish plates or frogs of the rails upon loss of air pressure in the tire.

Another object is the provision of such a tire in the form of a tire of the double tube type using an inner, air holding tube and tire flap, and capable of being readily disassembled and assembled for repair or replacement of the inner tube.

The objects of the invention are achieved by the provision of a casing, flap and inner tube so constructed and proportioned in relation to the wheel, the wheel flange, and the rails with their fish plates, frogs and other appurtenances, that upon loss of air pressure in the tire, certain solid portions of the tire will take the load and at the same time prevent the wheel flange from striking the fish plates, frogs or other appurtenances of the rails. The invention is embodied in a tire of the double tube type through the provision of a novel form of flap adapted to serve the usual function of a flap and to function as a load bearing member upon deflation of the tire.

The above and other objects and advantages of the invention will be understood more clearly from a perusal of the following specification and the drawings accompanying the same.

Figure 1:
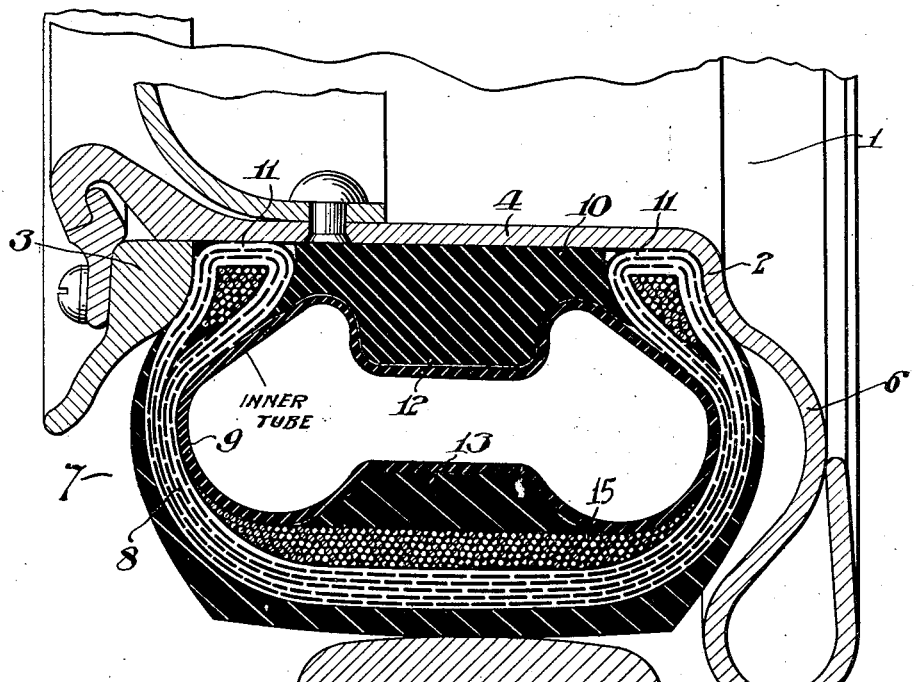
Fig. 1 is a transverse section of a tire and flanged wheel embodying my invention in a preferred form.

The flanged wheel comprises a channeled rim member 1 having an integral side wall portion 2 and removable tire retaining flange 3, which together with the bottom portion 4, form the tire retaining rim channel. The integral side wall portion 2 is extended to form the guide flange 5, the central portion 6 of the flange between the channel wall 2 and the periphery of the guide flange being offset away from the channel to provide clearance between the flange and the tire. The tire 7 comprises a shoe or casing member 8 open along its inner side to provide an opening for the insertion of an inner tube 9. This opening is overlapped and closed by a flap 10 positioned within the tire in overlapping engagement with the reentrant, beaded edge portions 11 of the opening.

Figure 4:
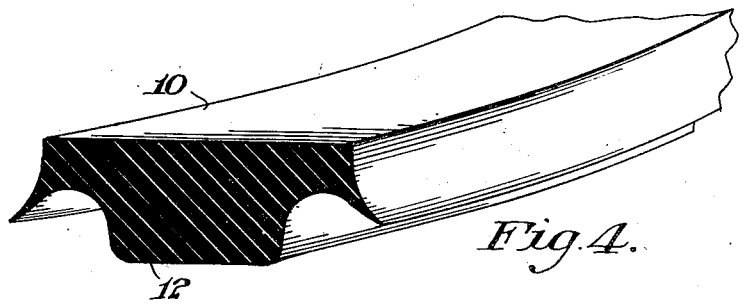
Fig. 4 is a view of the flap in section and perspective.

The flap 10 is provided with a central spacing portion 12 in the form of a thick rib extending radially into the tire. A lower spacing member 13 in the form of a thickened tread portion or rib is formed along the inside of the tread wall of the tire. Both spacing members 12 and 13 are preferably of resilient material such as rubber, and are preferably an integral part of the flap and tire casing respectively. The flap 10 thus preferably takes the form of a ribbed flap as shown in Fig. 4. Both spacing elements 12 and 13 are given a width of the order of the width of the rail head 14 on which the tire is to travel, preferably slightly less than that of the rail head, and are arranged so as to be centered above the center of the rail head when in use as indicated in Figs. 1 to 3.

Figure 2:
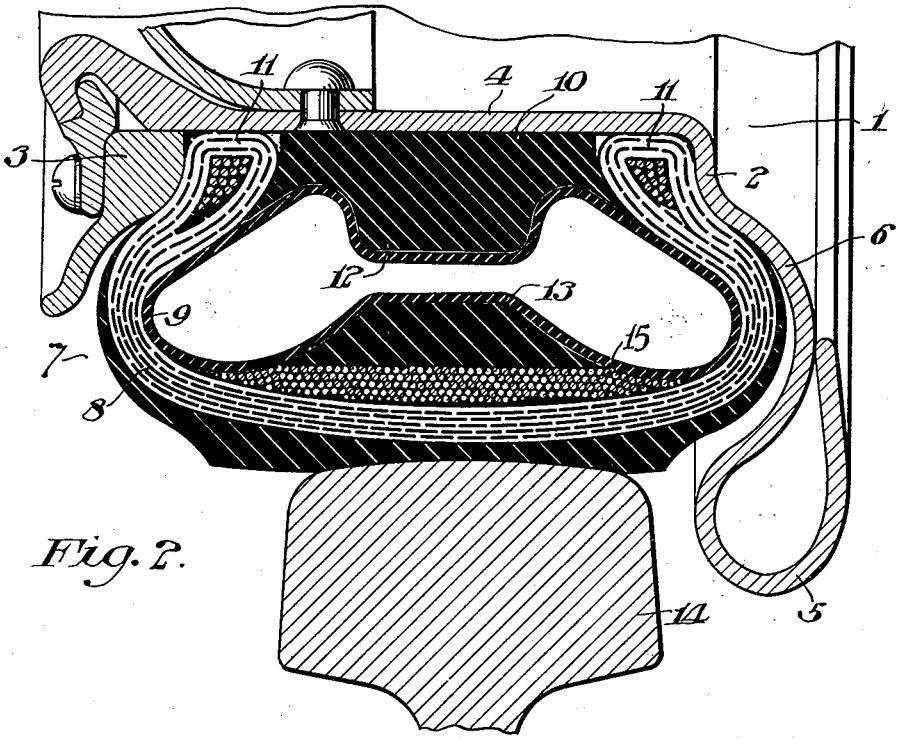
Fig. 2 is a similar view showing the tire inflated and under load.

To enable the tire to function normally as a full pneumatic tire, the spacing members 12 and 13 are given such combined radial depth that when the tire is inflated and under load, as shown in Fig. 2, the inner and outer walls of the inner tube between the adjacent surfaces of the spacing members will remain separated, thus forming the air core. On the other hand, this combined depth of the spacing members is so related to the depth of the guide flange 5 that upon deflation of the tire the parts will assume the position shown in Fig. 3 with the top and bottom spacing members engaged through the intermediation of the walls of the inner tube to take the load and limit the drop of the flange to prevent it from striking the fish plates, frogs or other appurtenances of the rails. The outward expansion of the tread wall of the tire is limited by an annular winding, as 15, of substantially inextensible nature, such as cables of twisted wires or the like.

Figure 3:
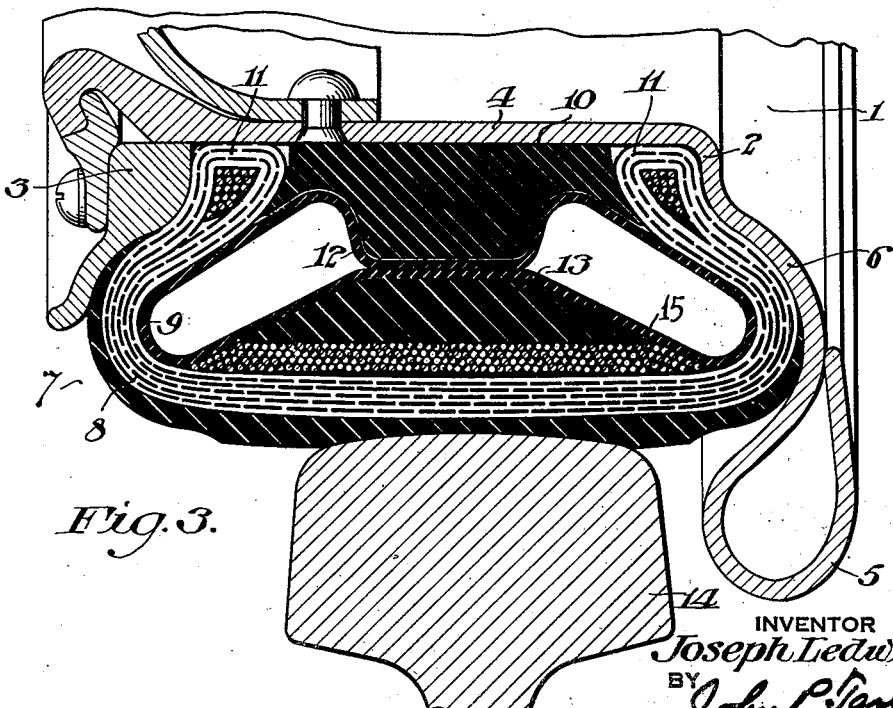
Fig. 3 is a view similar to Figs. 1 and 2 but showing the tire deflated and under load.

As an alternative, the lower spacing element 13 may be omitted, and the spacing member 12 extended radially to the combined depth of the two spacing members shown in Figs. 1 to 3, or the upper member 12 omitted and the lower member so extended. In either case the flap 10 is made sufficiently strong and durable to take the load, upon the deflation of the tire, without injury.

While I have thus shown and described a specific embodiment of the invention for the purpose of disclosure, it is to be understood that the invention is not limited to such specific embodiment, but contemplates all such modifications and alternative forms thereof as fall fairly within the scope of the appended claims.

What I claim is:

1. A pneumatic tired flanged wheel for railway rolling stock comprising a flanged wheel with channeled rim, a tire casing fitted into the rim channel and provided with an annular opening in its rim engaging side, a tire flap within the casing seated on the rim and having lateral thin tapered portions radially outwardly overlapping the side walls of the casing adjacent said opening and provided with a radially outward extending rib, an inside inwardly facing annular flat tread portion on the inside of the outer tire wall, and an inner tube in the space defined by said tire casing and flap, said inwardly facing tread portion and rib having parallel flat opposing surfaces of a width of the order of the width of the rail head and centered above the center of the rail head.

2. A pneumatic tired flanged wheel for railway rolling stock comprising a flanged wheel with channeled rim, a tire casing arranged to fit into the rim channel and provided with an annular opening in its rim engaging side, a tire flap within the casing seated on the rim and having lateral thin tapered portions radially outwardly overlapping the side walls of the casing adjacent said opening and provided with a central spacing element extending radially into the tire, a thickened tread portion carried by the outer tire wall extending inwardly of the tire toward said spacing element, an inner tube within the tire between said spacing element and said tread portion, said spacing element and tread portion being arranged to take the load only upon deflation of the tire and prevent the flange of the wheel from striking the fish plates or frogs of the rail when the tire is deflated.

3. A pneumatic tired flanged wheel for railway rolling stock comprising a flanged wheel with channeled rim, a tire casing fitted into the rim channel and provided with an annular opening in its rim engaging side, a tire flap within the casing seated on the rim and having lateral thin tapered portions radially outwardly overlapping the side walls of the casing adjacent said opening, a thickened tread portion carried by the outer tire wall extending radially inward of the tire toward the said flap a distance insufficient to take the load when the tire is inflated but insufficient to take the load and prevent the flange from striking the fish plates or frogs of the rails when the tire is deflated and an inner tube within the space defined by the tire casing and flap.

4. A pneumatic tired flanged wheel for railway rolling stock comprising a flanged wheel with channeled rim, a tire casing fitted into the rim channel and provided with an annular opening in its rim engaging side, a tire flap within the casing seated on the rim and having lateral thin tapered portions radially outwardly overlapping the side walls of the casing adjacent said opening, a thickened tread portion carried by the outer tire wall extending radially inward of the tire toward the said flap a distance insufficient to take the load when the tire is inflated but sufficient to take the load and prevent the flange from striking the fish plates or frogs of the rails when the tire is deflated, and an inner tube within the space defined by the tire casing and flap, together with a substantially inextensible annular winding located in the base portion of said inward extension.

JOSEPH LEDWINKA.